US 8,204,974 B1
Jun. 19, 2012

(12) United States Patent
Bhattacharyya et al.

(10) Patent No.: US 8,204,974 B1
(45) Date of Patent: Jun. 19, 2012

(54) IDENTIFYING SIGNIFICANT BEHAVIORS WITHIN NETWORK TRAFFIC

(75) Inventors: Supratik Bhattacharyya, San Francisco, CA (US); Kuai Xu, St. Paul, MN (US); Zhi-Li Zhang, Minneapolis, MN (US)

(73) Assignee: Sprint Communications Company L.P., Overland Park, KS (US)

( * ) Notice: Subject to any disclaimer, the term of this patent is extended or adjusted under 35 U.S.C. 154(b) by 1559 days.

(21) Appl. No.: 11/214,519

(22) Filed: Aug. 30, 2005

(51) Int. Cl.
*G06F 15/173* (2006.01)
*G06F 11/00* (2006.01)
*G06F 12/14* (2006.01)
*G06F 12/16* (2006.01)
*G08B 23/00* (2006.01)

(52) U.S. Cl. ............. 709/223; 726/22; 726/23; 726/24; 726/25

(58) Field of Classification Search .................. 709/223; 726/22–25
See application file for complete search history.

(56) References Cited

U.S. PATENT DOCUMENTS

| | | | | |
|---|---|---|---|---|
| 6,006,259 A * | 12/1999 | Adelman et al. | | 709/223 |
| 6,091,362 A * | 7/2000 | Stilp et al. | | 342/465 |
| 6,181,687 B1 * | 1/2001 | Bisdikian | | 370/347 |
| 6,259,690 B1 * | 7/2001 | Yoshizawa et al. | | 370/351 |
| 6,427,114 B1 * | 7/2002 | Olsson | | 701/117 |
| 6,549,538 B1 * | 4/2003 | Beck et al. | | 370/395.52 |
| 6,594,268 B1 * | 7/2003 | Aukia et al. | | 370/400 |
| 6,728,748 B1 * | 4/2004 | Mangipudi et al. | | 718/105 |
| 6,772,226 B1 * | 8/2004 | Bommareddy et al. | | 709/245 |
| 6,816,903 B1 | 11/2004 | Rakoshitz | | |
| 6,853,846 B1 * | 2/2005 | Lin et al. | | 455/453 |
| 6,975,638 B1 * | 12/2005 | Chen et al. | | 370/412 |
| 6,996,062 B1 * | 2/2006 | Freed et al. | | 370/235 |
| 7,006,472 B1 * | 2/2006 | Immonen et al. | | 370/332 |
| 7,042,848 B2 * | 5/2006 | Santiago et al. | | 370/253 |
| 7,092,438 B2 | 8/2006 | Rouphael | | |
| 7,113,932 B2 * | 9/2006 | Tayebnejad et al. | | 706/21 |
| 7,130,761 B2 | 10/2006 | Hall | | |
| 7,296,018 B2 | 11/2007 | Abe | | |
| 7,383,258 B2 * | 6/2008 | Harik et al. | | 707/5 |
| 7,406,653 B2 * | 7/2008 | Ide et al. | | 714/799 |
| 8,028,337 B1 * | 9/2011 | Xu et al. | | 726/23 |
| 2002/0122432 A1 * | 9/2002 | Chaskar | | 370/466 |
| 2002/0186661 A1 * | 12/2002 | Santiago et al. | | 370/252 |
| 2003/0081659 A1 * | 5/2003 | Yousef et al. | | 375/148 |
| 2003/0103525 A1 * | 6/2003 | Wahl | | 370/465 |
| 2004/0039820 A1 * | 2/2004 | Colby et al. | | 709/226 |
| 2004/0162901 A1 * | 8/2004 | Mangipudi et al. | | 709/225 |
| 2004/0250124 A1 * | 12/2004 | Chesla et al. | | 713/201 |
| 2005/0135416 A1 * | 6/2005 | Ketchum et al. | | 370/469 |

(Continued)

OTHER PUBLICATIONS

Cristian Estan, Stefan Savage, George Varghese, Automatically inferring patterns of resource consumption in network traffic, Proceedings of the 2003 conference on Applications, technologies, architectures, and protocols for computer communications, Aug. 25-29, 2003, Karlsruhe, Germany.*

(Continued)

*Primary Examiner* — Thu Ha Nguyen
*Assistant Examiner* — Tariq Najee-Ullah

(57) ABSTRACT

A system and a method for identifying significant behaviors from network traffic. A probability value is assigned to each cluster in a set of clusters. An uncertainty value is computed indicating a level of variability among the probability values. One or more clusters are removed from the set of clusters until the uncertainty value exceeds a desired uncertainty threshold, and each of the removed clusters is identified as a significant cluster.

7 Claims, 8 Drawing Sheets

U.S. PATENT DOCUMENTS

| | | | |
|---|---|---|---|
| 2005/0144148 A1* | 6/2005 | Hatonen et al. | 706/12 |
| 2006/0025161 A1* | 2/2006 | Funato et al. | 455/458 |
| 2006/0053123 A1* | 3/2006 | Ide et al. | 707/100 |
| 2006/0182118 A1* | 8/2006 | Lam et al. | 370/395.42 |
| 2006/0242706 A1* | 10/2006 | Ross | 726/23 |
| 2007/0058632 A1* | 3/2007 | Back et al. | 370/392 |
| 2007/0070907 A1* | 3/2007 | Kumar et al. | 370/235 |
| 2007/0079379 A1* | 4/2007 | Sprosts et al. | 726/24 |
| 2008/0134336 A1* | 6/2008 | Rihn et al. | 726/24 |

OTHER PUBLICATIONS

Wenke Lee, Dong Xiang, Information-Theoretic Measures for Anomaly Detection, Proceedings of the 2001 IEEE Symposium on Security and Privacy, p. 130, May 14-16, 2001.*

Paul Barford, Jeffery Kline, David Plonka, Amos Ron, A signal analysis of network traffic anomalies, Proceedings of the 2nd ACM SIGCOMM Workshop on Internet measurment, Nov. 6-8, 2002, Marseille, France.*

Balachander Krishnamurthy, Subhabrata Sen, Yin Zhang, Yan Chen, Sketch-based change detection: methods, evaluation, and applications, Proceedings of the 3rd ACM SIGCOMM conference on Internet measurement, Oct. 27-29, 2003, Miami Beach, FL, USA.*

Profiling internet backbone traffic: behavior models and applications—sprintlabs.com K Xu, ZL Zhang, S Bhattacharyya—Proceedings of the 2005 conference on Applications 2005 SIGCOMM'05, Aug. 22-26, 2005, Philadelphia, Pennsylvania.*

K Xu, ZL Zhang et al, Profiling internet backbone traffic: behavior models and applications, Aug. 22-26, 2005, SIGCOMM '2005, Philadelphia, Pennsylvania, ACM.*

K Xu, ZL Zhang et al, Internet traffic behavior profiling for network security monitoring, IEEE/ACM, Dec. 2008.*

V. Krmicek, Hardware-Accelerated Anomaly Detection in High-Speed Networks, Jan. 2008, Masaryk University Faculty of Informatics.*

A. Callado, C. Kamienski et al, A Survey on Internet Traffic Identification, Third Quarter 2009, IEEE Communications Surveys & Tutorials, vol. 11, No. 3.*

Ondrej Linda, et al, Towards Resilient Critical Infrastructures: Application of Type-2 Fuzzy Logic in Embedded Network Security Cyber Sensor, 2011, IEEE.*

M. Rehak, Multiagent Trust Modeling for Open Network Environments, Jun. 2008, Czech Technical University in Prague, Faculty of Electrical Engineering, Department of Cybernetics.*

V. Kumar et al, Situational Awareness Analysis Tools for Aiding Discovery of Security Events and Patterns, Sep. 2005.*

* cited by examiner

US 8,204,974 B1

IDENTIFYING SIGNIFICANT BEHAVIORS WITHIN NETWORK TRAFFIC

CROSS-REFERENCE TO RELATED APPLICATIONS

This application is related by subject matter to the invention disclosed in the following commonly assigned application: U.S. patent application Ser. No. 11/214,502, filed on even date herewith, entitled "Generating Profiles of Network Traffic."

STATEMENT REGARDING FEDERALLY SPONSORED RESEARCH OR DEVELOPMENT

Not applicable.

BACKGROUND

As computer networks such as the Internet continue to grow in size and complexity, the challenge of effectively provisioning, managing and securing networks has become linked to a deep understanding of their traffic. Indeed, recent spates of cyber-attacks and the frequent emergence of applications affecting Internet traffic dynamics demonstrate the importance of identifying and profiling significant communication patterns within network traffic data. Nevertheless, because of the vast quantities of data and the wide diversity of traffic on large networks, developing a comprehensive understanding of the collected data remains a daunting and unfulfilled task. Most of the prior work in this area has focused on specific aspects of traffic or applied metrics that are deemed interesting a priori to identify significant network events of interest. For example, several systems today focus on techniques for identifying port scans or for analyzing worm and other exploit activities on the Internet. Further, signature-based intrusion detection systems look for well-known signatures or patterns in network traffic, while several anomaly detection systems have been developed using data mining techniques.

However, there are currently insufficient techniques in the art directed towards generating general profiles of traffic in terms of behaviors, i.e., communication patterns of end-hosts and services. The need for such profiles has become increasingly imperative and urgent in light of wide spread cyber attacks and the frequent emergence of disruptive applications that can rapidly alter the dynamics of network traffic and bring down valuable Internet services. Accordingly, there is a need for improved systems and methods that can identify significant communication patterns from traffic data. Further, there is a need for improved systems and methods that can profile significant communication patterns and provide a plausible interpretation of these behaviors.

SUMMARY

The present invention meets at least the above needs and overcomes one or more deficiencies in the prior art by providing systems and methods for identifying significant behaviors from network traffic. In one aspect of an embodiment of the present invention, a computer-implemented method is provided. A probability value is assigned to each cluster in a set of clusters. An uncertainty value is computed indicating a level of variability among the probability values. One or more clusters are removed from the set of clusters until the uncertainty value exceeds a desired uncertainty threshold, and each of the removed clusters is identified as a significant cluster.

Another aspect of an embodiment of the present invention includes a system for identifying clusters exhibiting significant behaviors. A probability component is configured to associate a set of probability values with a set of clusters. Each probability value relates to the number of flows in a cluster. A relative uncertainty component is configured to generate an uncertainty value indicating a level of relative uncertainty among the set of probability values. The system also includes a significant cluster identifier configured to remove clusters from the set of clusters until the uncertainty value exceeds a desired uncertainty threshold. Each of the removed clusters is identified as a significant cluster.

A further aspect of an embodiment of the present invention includes a computerized method for identifying significant clusters from network traffic. Clusters are created by grouping packet flows together. A packet flow is an aggregation of packets having common flow dimensions, and the packet flows are grouped into clusters by combining flows having a common value for a given flow dimension (e.g., a common source IP address). Each cluster is placed into a set of clusters. A probability value related to the number of flows in a cluster is assigned to each cluster. Clusters having an assigned probability value above a probability threshold are removed from the set of clusters and are identified as significant clusters. The method decreases the probability threshold and continues removing clusters until an uncertainty value equals or exceeds an uncertainty threshold.

BRIEF DESCRIPTION OF THE SEVERAL VIEWS OF THE DRAWING

The present invention is described in detail below with reference to the attached drawing figures, wherein.

DETAILED DESCRIPTION

Figure 1:
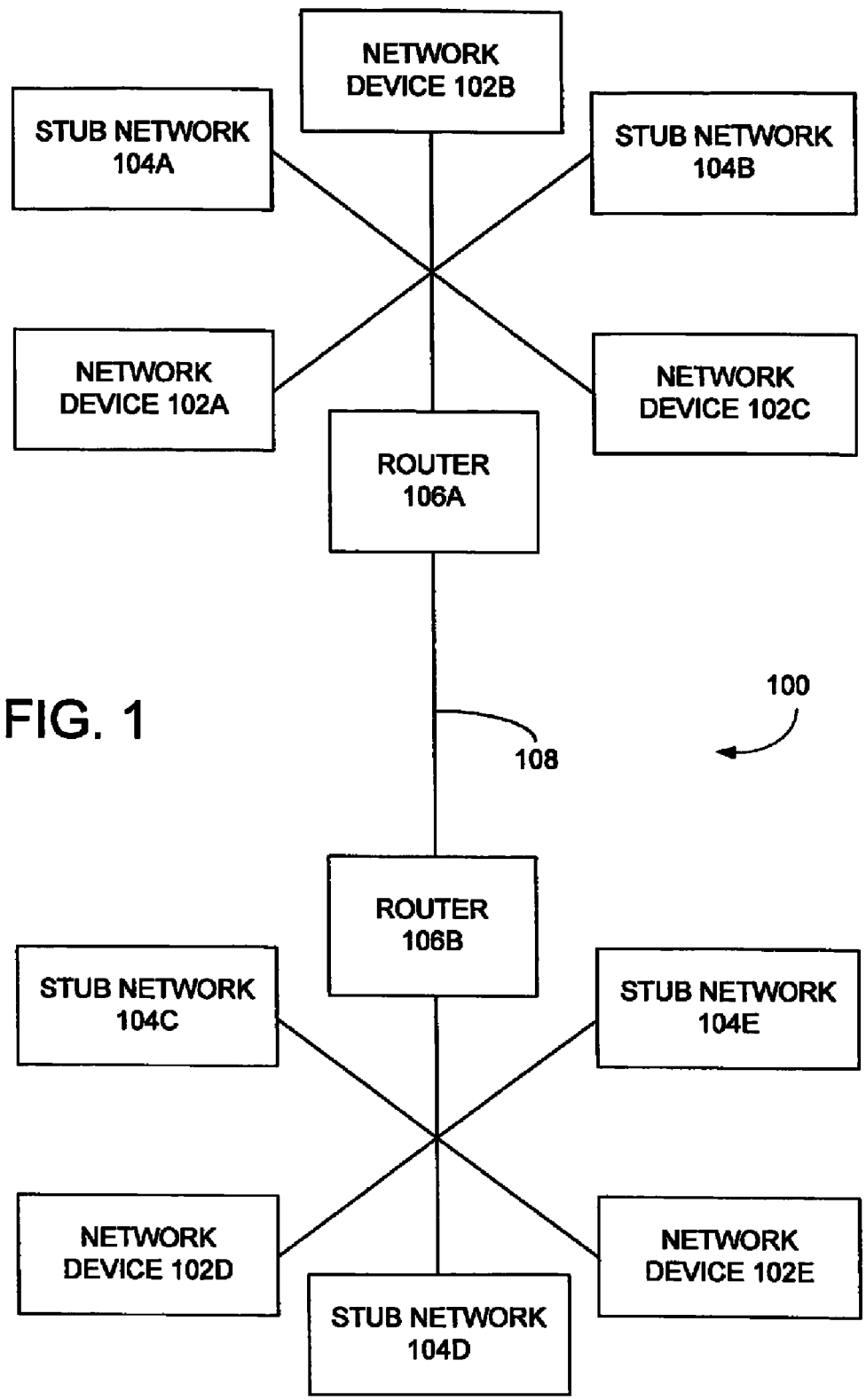
FIG. 1 is a block diagram of a network environment suitable for use in implementing the present invention.

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for identifying significant behaviors from network traffic and for profiling these significant events. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

Various embodiments of the present invention compute and apply a value indicating a degree of variability, uniformity or uncertainty in a set of data values. Techniques for generating such values are well known in the art. For example, consider a random variable X that may take $N_X$ discrete values. Suppose X was randomly sampled or observed for m times, which induces an empirical probability distribution on X, $p(x_i)=m_i/m$, $x_i \in X$, where $m_i$ is the frequency or number of times we observe X taking the value $x_i$. The (empirical) entropy of X may be defined as:

$$H(X) := -\sum_{x_i \in X} p(x_i) \log p(x_i)$$

where by convention 0 log 0=0.

As known to those skilled in the art, entropy measures the "observational variety" in the observed values of X. It may be noted that unobserved possibilities (due to 0 log 0=0) do not enter the measure, and $0 \leq H(X) \leq H_{max}(X):=\log \min \{N_X, m\}$. $H_{max}(X)$ may be referred to as the maximum entropy of (sampled) X, as $2^{H_{max}(X)}$ is the maximum number of possible unique values (i.e., "maximum uncertainty") that the observed X can take in m observations. Clearly, H(X) is a function of the support size $N_X$ and sample size m. Assuming that $m \geq 2$ and $N_X \geq 2$ (otherwise there is no "observational variety"), the standardized entropy may be referred to as relative uncertainty (hereinafter "RU"), as it provides an index of variety or uniformity regardless of the support or sample size. RU may be defined as:

$$RU(X) := \frac{H(X)}{H_{max}(X)} = \frac{H(X)}{\log \min\{N_x, m\}}$$

Clearly, if RU(X)=0, then all observations of X are of the same kind, i.e., p(x)=1 for some x∈X. Thus, observational variety is completely absent. More generally, let A denote the (sub)set of observed values in X, i.e., $p(x_i)>0$ for $x_i \in A$. Suppose $m \leq N_X$. Then RU(X)=1 if and only if |A|=m and $p(x_i)=1/m$ for each $x_i \in A$. In other words, all observed values of X are different or unique, thus the observations have the highest degree of variety or uncertainty. Hence, RU(X) provides a measure of "randomness" or "uncertainty" of the values that the observed X may take.

In the case of $m > N_X$, RU(X)=1 if and only if $m_i = m/N_X$. Thus $p(x_i)=1/N_X$ for $X_i \in A=X$, i.e., the observed values are uniformly distributed over X. In this case, RU(X) measures the degree of uniformity in the observed values of X. As a general measure of uniformity in the observed values of X, we consider the conditional entropy H(X|A) and conditional relative uncertainty RU(X|A) by conditioning X based on A. Then we have H(X|A)=H(X), $H_{max}(X|A)=\log|A|$ and RU(X|A)=H(X)/log|A|. Hence RU(X|A)=1 if and only if $p(x_i)=1/|A|$ for every $x_i \in A$. In general, RU(X|A)≈1 means that the observed values of X are closer to being uniformly distributed, thus less distinguishable from each other. Whereas RU(X|A)<<1 indicates that the distribution is more skewed, with a few values more frequently observed. Considering the foregoing, it will be apparent to those skilled in the art that any number of techniques and methods may be used to compute the variability, uniformity or uncertainty in a set of data values and that the present invention is not limited to any particular set of calculations.

FIG. 1 illustrates a network 100 that represents an exemplary environment in which the present invention may be practiced. The system 100 includes network devices 102A-102E (collectively hereinafter, the network devices 102). The network devices 102 may be any devices capable of accessing the network 100 and communicating with the network 100. For example, a portion of the network devices 102 may be computers with network interface capabilities. The system 100 further includes stub networks 104A-104E (collectively hereinafter, the stub networks 104). A stub network is any network that carries packets to and from devices on that network, and the stub networks 104 may be, for example, private enterprise networks. In one embodiment, the stub networks 104 do not carry traffic for other networks, and the stub networks 104 rely on other elements of the network 100 to transport packets among the various stub networks 104 and the network devices 102.

The system 100 also includes a router 106A and a router 106B (collectively hereinafter, the routers 106) that are connected by a link 108. As will be appreciated by those skilled in the art, the link 108 may be considered the backbone of the network 100. The routers 106 may be any routing devices capable of receiving transmitted packets and routing them on to a desired destination. For example, the network device 102A may transmit a group of packets to the network device 102D. These transmitted packets may be received by the router 106A, and the router 106A may cause the packets to traverse the link 108. After receipt by the router 108B, the packets may be delivered to the network device 102D.

Because the network 100 passes traffic between the stub networks 104 in addition to carrying traffic for the network devices 102A, the network 100 may be considered a transit network. As will be appreciated by those skilled in the art, a transit network may carry a very diverse traffic mix. Further, the provider of the network 100 may have minimal knowledge concerning the devices in the stub networks 104 or the traffic being transported on the link 108.

It is important to note that network systems in which the present invention may operate may be arranged in a variety of configurations, and the network 100 of FIG. 1 provides only one exemplary network environment. The network 100 may be a Tier 1 ISP network that provides transit services to smaller ISP networks and to enterprise networks. As a further example, additional routers may be connected to the routers 106 by additional links. Of course, more stub networks and network devices may be interconnected with each of these additional routers. Also, the present invention may be implemented in a network environment that has multiple backbones. The information utilized by the present invention may be gathered by tapping any link on a network. For example, the tapped link may connect a single computer to the network, or the tapped link may be an IP backbone.

Figure 2:
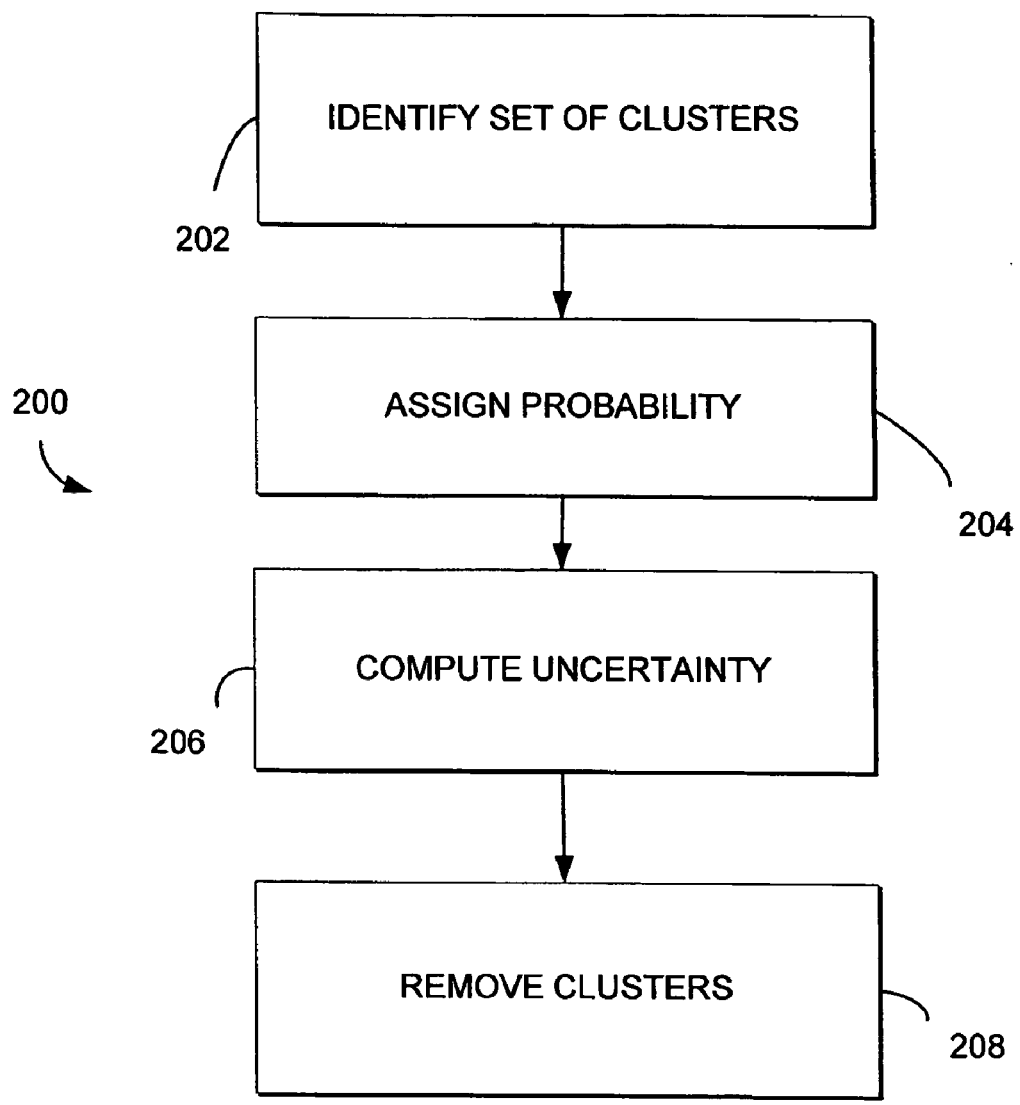
FIG. 2 illustrates a method in accordance with the present invention for identifying significant clusters from traffic traversing a network link.

FIG. 2 illustrates a method 200 for identifying significant clusters from traffic traversing a network link. At a step 202, the method 200 identifies clusters observed traversing the network link. For example, the network link may be tapped by a packet sniffer capable of reading information from the various transmissions traversing the link. Such a packet-sniffing device is well known in the art. The information read from the packets may indicate the source of a transmission, such as the IP address of a source device.

In one embodiment, the packets observed on the link are aggregated into "flows" based on the well-known five-tuple—the source IP address (srcIP), destination IP address (dstIP), source port (srcPrt), destination port (dstPrt), and protocol fields. These attributes may also be described as the dimensions of a flow. Ignoring the protocol fields, each flow may be described with reference to a four-dimensional feature space consisting of srcIP, dstIP, srcPrt and dstPrt. Using this four-dimensional feature space, the method 200 may identify a set of clusters where each cluster is comprised of flows with the same feature value in one of the dimensions. For example, each flow emanating from the same source IP address may be grouped together as a cluster. It should be noted that any of the dimensions (srcIP, dstIP, srcPrt, or dstPrt) may be used to create the clusters. Those skilled in the art will appreciate that the significant srcIP and dstIP clusters will yield a set of "interesting" host behaviors (communication patterns), while the srcPrt and dstPrt clusters will yield a set of "interesting" service/port behaviors, reflecting the aggregate behaviors of individual hosts on the corresponding ports.

At a step 204, the method 200 assigns a probability value to each of the clusters in the set of clusters. The probability value may relate to a property of the clusters. For example, the value may be based on the number of flows in a cluster. Accordingly, if m is the total number of flows observed during a time interval, then $A=\{a_1, \ldots, a_n\}$, $n \geq 2$, may represent the set of clusters. The (induced) probability distribution $P_a$ is given by $p_i := P_a(a_i) = m_i/m$, where $m_i$ is the number of flows that take the value $a_i$ (e.g., having the srcIP $a_i$). Stated another way, in this example, the probability value assigned to each cluster ($p_i$) is the quotient of the number of flows in the cluster ($m_i$) divided by the total number of flows (m). Those skilled in the art will appreciate that any number of different properties may be reflected in the probability value.

At a step 206, an uncertainty value is computed by the method 200. The uncertainty value indicates a level of uncertainty or variability among the probability values assigned to the clusters in the set of clusters. For example, the (conditional) relative uncertainty, $RU(P_A)$ may measure the degree of uniformity in the observed features A. If $RU(P_A)$ is close to 1, then the observed values are close to being uniformly distributed, and are nearly indistinguishable. Otherwise, there are likely feature values in A that "stand out" from the rest. Returning to the volume example, if a few clusters have a large number of flows, while the majority of the clusters have relatively few flows, the few clusters with the large volume of flows will stand out and drive down the value of RU. As previously mentioned, techniques for computing uncertainty or variability values are well known in the art, as well as the techniques for generating the standardized entropy value RU.

The method 200, at a step 208, removes clusters from the set of clusters. In one embodiment, clusters are removed until the uncertainty value for the remaining clusters is equal to or in excess of a desired uncertainty threshold (represented hereinafter as "β"). In this embodiment, each of the removed clusters is identified as a significant cluster. Accordingly, the subset S of A may contain the removed or significant clusters, while the subset R may contain the remaining values of A such that R=A−S. Upon removal of one or more clusters from A, the (conditional) probability distribution on the set of the remaining values (i.e. $RU(P_R)$) may be computed and compared to the uncertainty threshold β. The threshold β may be a value close to 1 (i.e. ~0.9) such that when $RU(P_R)$ is equal to or in excess of β, $P_R$ will approach a uniform distribution. In this case, each cluster having a significant or outlying $p_i$ will reside in subset S, the set of significant clusters. Stated another way, S contains the most significant feature values in A, while the remaining values are nearly indistinguishable from each other.

In one embodiment, the method 200 selects the removed clusters A such that the probability of any value in S is larger than those of the remaining values and such that the (conditional) probability distribution on the set of the remaining values, is close to being uniformly distributed, i.e., $RU(P_R) > \beta$. In this embodiment, to see what S contains, the feature values of A may be ordered based on their probabilities: let $\hat{a}_1, \hat{a}_2, \ldots, \hat{a}_n$ be such as $P_A(\hat{a}_1) \geq P_A(\hat{a}_2) \geq \ldots P_A(\hat{a}_n)$. Then $S=\{\hat{a}_1, \hat{a}_2, \ldots, \hat{a}_{k-1}\}$ and $R=A-S=\{\hat{a}_k, \hat{a}_{k+1}, \ldots, \hat{a}_{n-1}, \hat{a}_n\}$ where k is the smallest integer such that $RU(P_R) > \beta$. If $\alpha^* = \hat{a}_{k-1}$, then $\alpha^*$ is the largest "cut-off" threshold such that the (conditional) probability distribution on the set of remaining values R is close to being uniformly distributed.

In one algorithm to determine $\alpha^*$, an appropriate initial value $\alpha_0$ (e.g., $\alpha_0=2\%$) is selected, and the algorithm seeks out the optimal cut-off threshold $\alpha^*$ via "exponential approximation" (reducing the threshold a by an exponentially decreasing factor $1/2^k$ at the kth step). As long as the relative uncertainty of the (conditional) probability distribution $P_R$ on the (remaining) feature set R is less than β, the algorithm examines each feature value in R and includes those whose probabilities exceed the threshold a into the set S of significant feature values. The algorithm stops when the probability distribution of the remaining feature values is close to being uniformly distributed (i.e. greater than or equal to β). Accordingly, the algorithm adaptively adjusts the "cut-off" threshold $\alpha^*$ based on the underlying feature value distributions to extract significant clusters.

Figure 3:
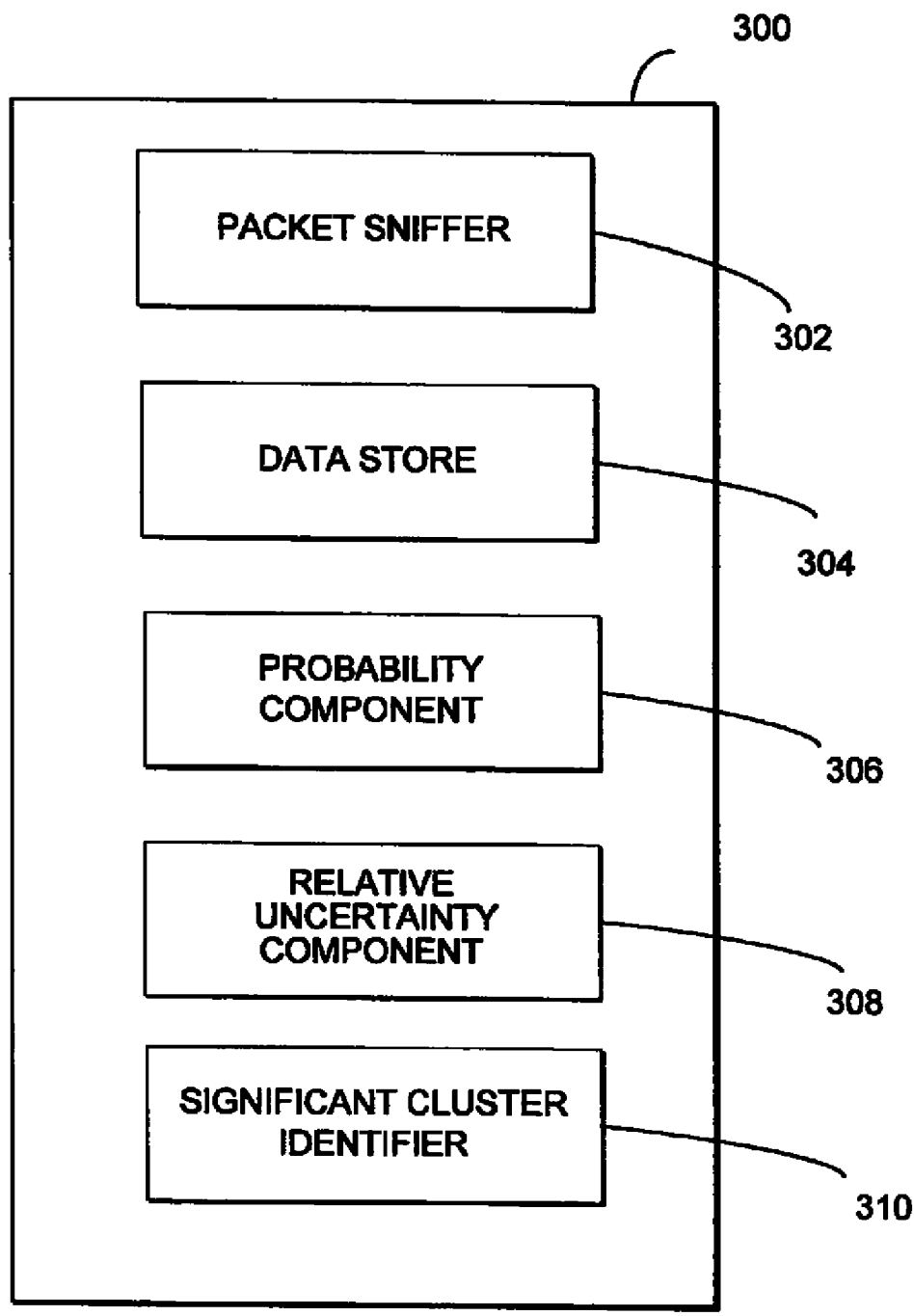
FIG. 3 is a schematic diagram representing a system in accordance with the present invention for identifying clusters exhibiting significant behaviors.

FIG. 3 illustrates a system 300 for identifying clusters exhibiting significant behaviors. The system 300 includes a packet sniffer 302 configured to collect data associated with a set of clusters. A packet sniffer is a device that is able to access a network link and see traffic passing across the link. Any variety of packet sniffers known in the art may be acceptable for use with the present invention, and the packet sniffer 302 may tap a link such as link 108 of the network 100 shown on FIG. 1. As data travels over a network link, the packet sniffer 302 may capture packets and decode information such as the packets' headers. This information may indicate the source IP address and port of a packet, as well as its destination IP address and port. As previously set forth, this information may allow the packets to be divided into flows and into clusters of flows. For instance, each flow emanating from a source port (srcPrt) may be grouped into a cluster. Further, each of these srcPrt clusters may be aggregated into a set of clusters.

The system 300 also includes a data store 304 configured to store information received from the packet sniffer 302. The data store 304 may be any storage media, and the data may be arranged in a variety of different formats. For example, the data may be organized by flows and clusters of flows.

A probability component 306 is included in the system 300. The probability component 306 may be configured to access the data in the data store 304 and to analyze a set of clusters. In one embodiment, the probability component 306 is configured to determine a probability value for each cluster in the set of clusters. The probability value may vary based on a characteristic of a cluster, such as the number of flows in a cluster. In one embodiment, the probability value is the number of flows in a cluster divided by the total number of flows. In this example, a cluster with a large number of flows is assigned a large probability value, while a cluster with only a few flows receives a smaller probability value.

The system 300 also includes a relative uncertainty component 308 configured to receive the probability values and to generate an uncertainty value for the set of clusters. The uncertainty value indicates the level of uncertainty among the probability values of the set's clusters. As previously discussed, when the probability values approach a uniform distribution, the relative uncertainty value for the set approaches a value of one. In one embodiment, each time one or more clusters are removed from the set, the relative uncertainty component 308 considers the remaining clusters and updates the uncertainty value for the set.

A significant cluster identifier 310 is also included in the system 300. The significant cluster identifier 310 is configured to remove significant clusters from the set of clusters. In one embodiment, the significant cluster identifier 310 removes significant clusters until the uncertainty value of the remaining set is equal to or in excess of a desired uncertainty threshold. For example, if the probability value is related to the number of flows in a cluster, the significant cluster identifier 310 may first mark the clusters having the most flows as significant and remove those clusters from the set of clusters. Subsequently, the significant cluster identifier 310 may continue to remove the largest remaining clusters from the set until the relative uncertainty for the set is equal to or in excess of the desired uncertainty threshold. Of course, the relative uncertainty component 308 may be utilized throughout this removal process to update the uncertainty value for the remaining set. Those skilled in the art will recognize that, by removing the clusters with the largest number of flows, the remaining set will become more and more uniform, and thus, its RU value will approach a threshold close to one. Once the RU value of the remaining set obtains the threshold, removal of clusters by the significant cluster identifier 310 may cease, and the removed clusters may be deemed to exhibit significant behaviors and be marked for further analysis.

Figure 4:
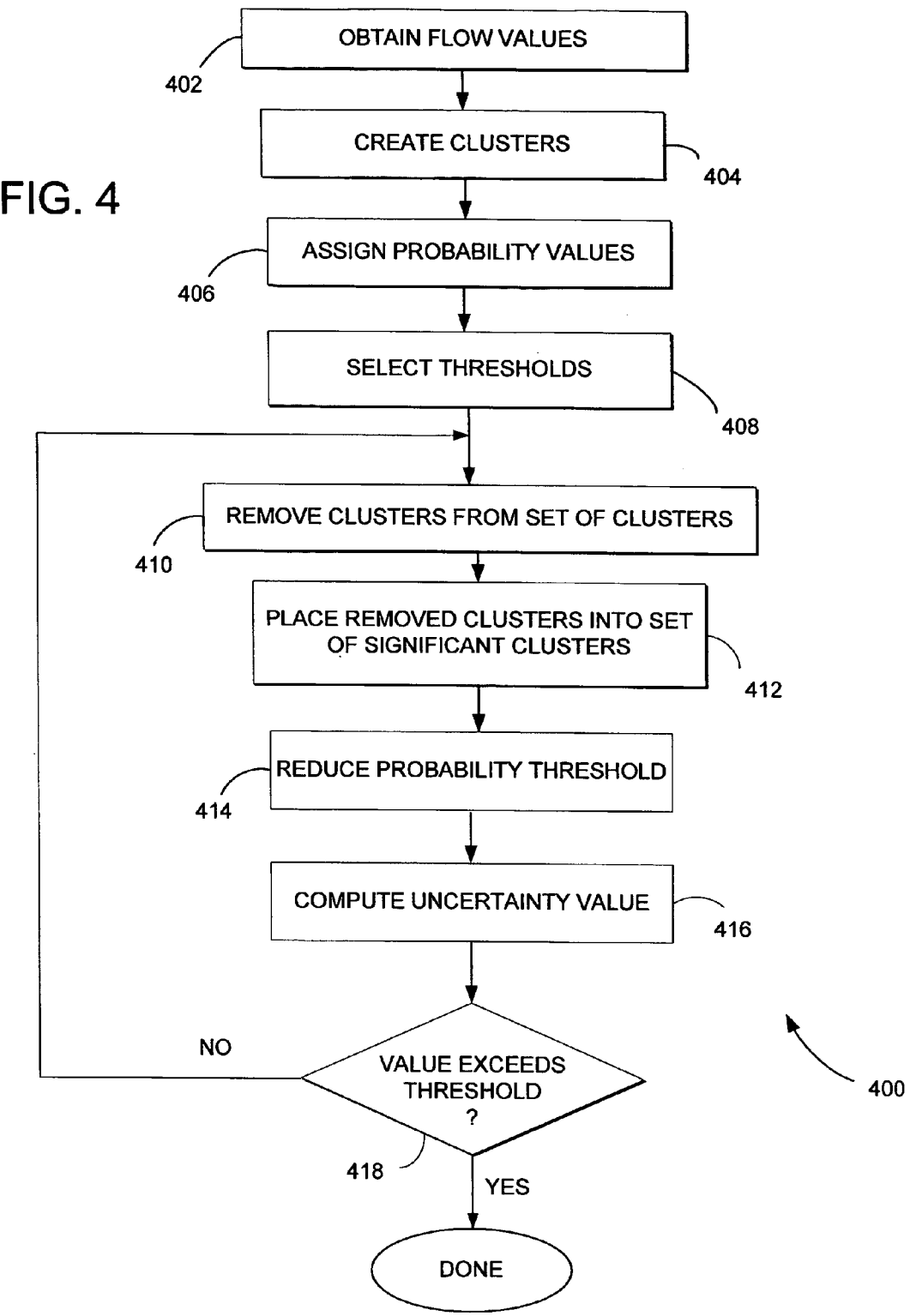
FIG. 4 illustrates a method in accordance with the present invention for identifying a set of significant clusters from traffic on a computer network.

FIG. 4 illustrates a method 400 for identifying a set of significant clusters from traffic on a computer network. At a step 402, the method 400 obtains values associated with flows traversing a link on the computer network. These values may correspond to flow dimensions such as srcIP, dstIP, srcPrt, and dstPrt. At a step 404, the method 400 creates clusters of flows by grouping together flows that share a common dimension. Each of these clusters may be referred to as a set of clusters. For example, if 100 distinct destination addresses are found in the observed flows, then the flows may be divided into 100 clusters (one for each dstIP). These 100 dstIP clusters may be grouped together as the set of clusters.

The method 400, at a step 406, assigns a probability value to each cluster. The probability value may relate to an aspect of a cluster, such as its volume. By basing the probability value on the volume of flows in a cluster, the significant clusters will be identified based on volume—the larger the volume of a cluster, the more likely it will be identified as a significant cluster. Those skilled in the art will appreciate that any property of a cluster may be selected for use with the probability value and that the significant clusters will be selected in accordance with the selected property.

At a step 408, the method 400 selects a probability threshold and an uncertainty threshold. The probability threshold indicates a probability where clusters above the probability threshold are deemed to be significant. As will be discussed, the probability threshold is downwardly adjusted throughout the performance of the method 400. Accordingly, the initial value of the probability threshold may be selected such that relatively few clusters have a probability value in excess of the threshold. Such an initial value may be selected with reference to the probability values or to historical data. The uncertainty threshold is a target level of uncertainty. The uncertainty threshold should indicate a uniform distribution such that when the threshold is achieved, no significant clusters remain in the set. To this end, in one embodiment, the uncertainty threshold is set to 0.9.

The method 400, at a step 410, removes from the set of clusters each cluster that is assigned a probability value above the probability threshold, and the removed clusters are placed into a set of significant clusters at a step 410. As these clusters have outlying probability values, they may be marked as significant. As will be discussed, various further analyses may be conducted to profile these significant clusters.

At a step 414, the method 400 decreases the probability threshold. Any level of decrease may be appropriate. For example, the threshold may be decreased by an experientially decreasing factor, or the threshold may be decreased by a constant value.

The method 400, at a step 416, computes an uncertainty value indicating a level of uncertainty among the probability values assigned to the remaining clusters. As previously set forth, the RU value relates to the uniformity or variability of the probability values associated with the set's clusters.

At a step 418, the method 400 determines whether the uncertainty value exceeds the uncertainty threshold. When the value does not exceed the threshold, the method 400 repeats the steps 410-416. Such iteration is necessary to remove additional, significant clusters from the set of clusters; by continuing to remove the outlying clusters, the uniformity of the remaining clusters will increase and the uncertainty value will eventually exceed the threshold. As the step 414 decreases the probability threshold every iteration, additional clusters become subject to removal at the step 410. Once, the uncertainty value exceeds the uncertainty threshold, the method 400 may cease performance and the set of significant clusters may be considered complete.

Figure 5:
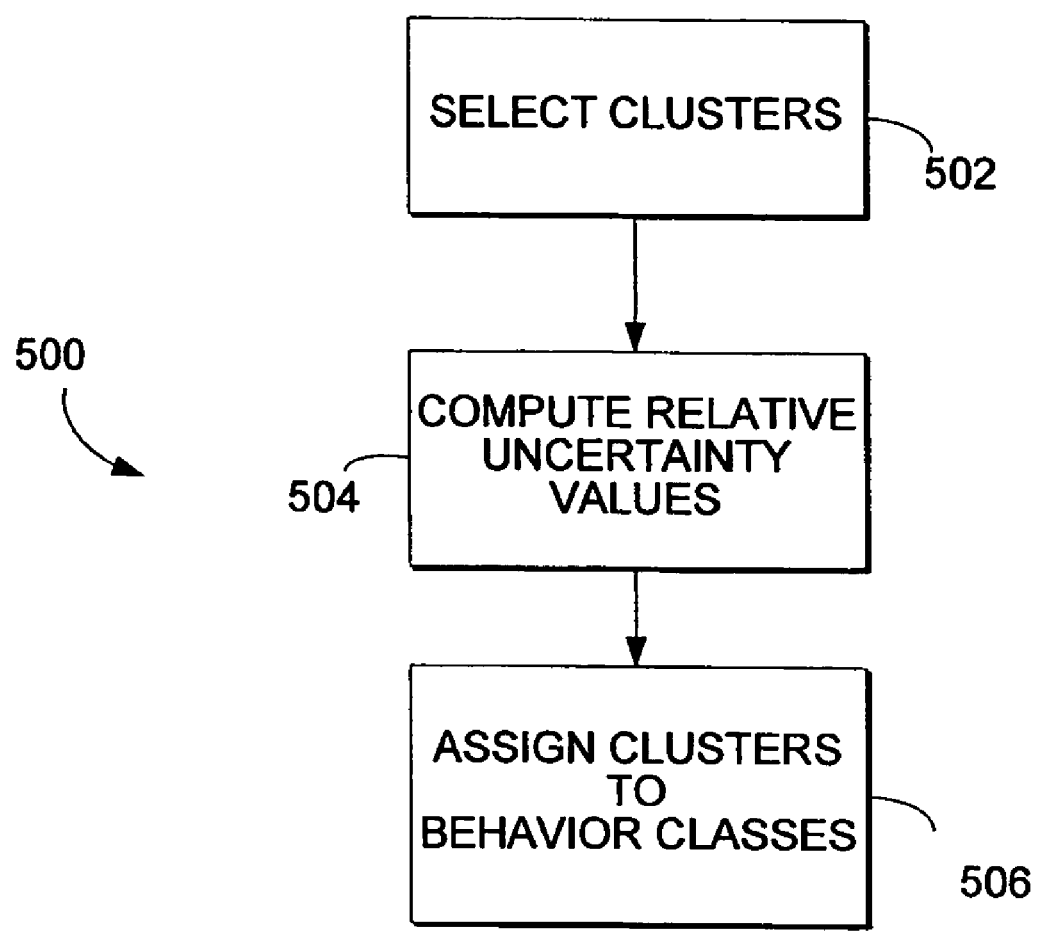
FIG. 5 illustrates a method in accordance with the present invention for profiling traffic on a computer network.

FIG. 5 illustrates a method 500 for profiling traffic on a computer network. At a step 502, the method 500 selects a plurality of clusters for analysis and profiling. In selecting these clusters, methods such as the previously discussed method 200 and the method 400 may be performed. However, any selection process may be used by the method 500 to select clusters, and the present invention is not limited to consideration of certain types of clusters.

The method 500, at a step 504, computes relative uncertainty values for each of the clusters, and these relative uncertainty values indicate a degree of variability in the cluster for the flow dimensions. For example, the step 504 may compute values indicating the RU in a srcIP cluster for the dimensions of dstIP, srcPrt, and dstPrt. Continuing this example, a set of srcIP clusters may be extracted from flows observed in a given time slot. Because the flows in each cluster share the same srcIP address, this dimension may be referred to as the "cluster key." Further the other three dimensions (dstIP, srcPrt, and dstPrt) may take any possible values and may be referred to as "free" dimensions. Hence, the flows in a cluster induce a probability distribution on each of the three "free" dimensions, and a relative uncertainty measure can be defined for each. Stated another way, for each cluster extracted along a fixed dimension, the variables X, Y and Z may denote its three "free" dimensions. Hence for a srcIP cluster, X, Y, and Z denote the srcPrt, dstPrt and dstIP dimensions, respectively. This cluster may be characterized by an RU vector $[RU_X, RU_Y, RU_Z]$. Accordingly, in one embodiment, the method 500 generates an RU vector containing an RU value for each free dimension.

At a step 506, the method 500 assigns clusters exhibiting similar behaviors to the same behavior class. The RU values may be divided into any number categories, and, in general, with N categories, the number of behavior classes will be $3^N$. In one embodiment, to group clusters with similar behaviors, each RU dimension is divided into three categories: low, medium and high. Low RU values are represented with a 0, medium represented with a 1, and high RU values represented with a 2. Applying this labeling concept, a label L(ru) may take the form:

$$L(ru) = \begin{cases} 0 \text{ (low), if } 0 \le ru \le e \\ 1 \text{ (medium), if } e < ru < 1 - e \\ 2 \text{ (high), if } 1 - e \le ru \le 1 \end{cases}$$

For example, a srcIP cluster may have a high degree of relative uncertainty for the srcPrt and dstPrt dimensions, but a very low uncertainty for the dstIP dimension. This cluster may be characterized by a vector L(ru)=[2, 2, 0].

Using this labeling process, $3^3$ or 27 different possible values for L(ru) are possible, and each cluster having the same L(ru) vector will exhibit similar behaviors. Accordingly, these 27 L(ru) vectors may be used to divide the clusters into 27 behavior classes. As will be appreciated by those skilled in the art, the L(ru) vector may be considered the behavioral profile of a behavior class—the L(ru) vector indicates a degree of variability in the flow dimensions shared by the member clusters of the class. Those skilled in the art will further recognize that any number of behavior classes may be created by the present invention and that clusters having similar RU vectors may be combined with any number of techniques to create the behavior classes.

Figure 6:
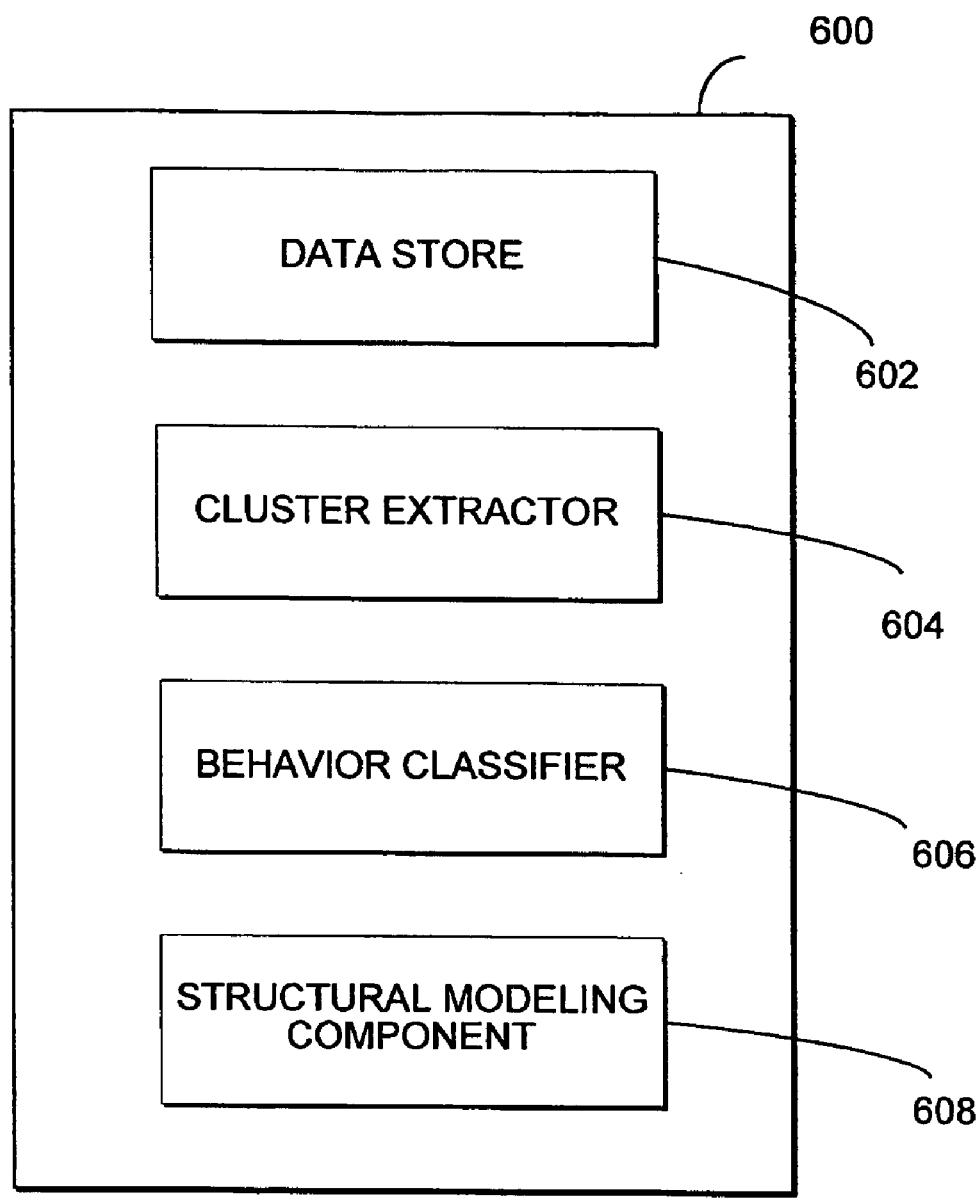
FIG. 6 is a schematic diagram representing a system in accordance with the present invention for profiling flows traversing a network link.

FIG. 6 illustrates a system 600 for profiling flows traversing a network link. The system includes a data store containing values associated with flows observed on the link. These values may indicate the source IP address and port of a flow, as well as its destination IP address and port. A cluster extractor 604 may utilize these values to group the flows into clusters and to select clusters for further analysis (i.e. profiling). While any selection algorithm may be implemented by the cluster extractor 604, in one embodiment, only significant clusters exhibiting behaviors of interest are selected by the clusters extractor 604.

The system 600 also includes a behavior classifier 606 configured to assign each of the clusters to a behavior class. Each behavior class may be assigned an associated behavioral profile indicating a degree of variability for various flow dimensions. For example, one behavior class may have a profile indicating a high level of variability for the dstIP dimension, but low variability for the srcPrt and dstPrt dimensions. Accordingly, each cluster exhibiting this pattern of variability will be assigned to this behavior class by the behavior classifier 606. In one embodiment, the behavior profile specifies a range of relative uncertainty values for each free dimension, and the behavior classifier 606 computes relative uncertainty values for each free dimension of a cluster. These relative uncertainty values are then compared to the ranges of relative uncertainty values associated with the behavior classes to determine which class a cluster should be placed.

The behavior classifier 606 may optionally be configured to track temporal properties of the behavior classes (hereinafter "BC"s). For example, the behavior classifier 606 may capture different aspects of the characteristics of the BC's over time. These aspects include the popularity, i.e., the number of times a particular BC appears (at least one cluster belonging to the BC is observed). The average number of clusters belonging to a given BC may be tracked, as well as the membership volatility. The volatility measure indicates whether a given BC tends to contain the same clusters over time (i.e., the member clusters re-appear over time). Those skilled in the art will recognize that the behavior classes defined by the RU-based behavior classification scheme may manifest distinct temporal characteristics, as captured by the frequency, populousness and volatility metrics. Accordingly, the behavior classifier 606 may track these characteristics.

The behavior classifier 606 may also optionally be configured to track the behavior characteristics of individual clusters over time. In particular, the behavior classifier 606 may be configured to determine a relation between the frequency of a cluster (i.e., how often it is observed) and the behavior class(es) it appears. Further the behavior classifier 606 may also track the behavior stability of a cluster if it appears multiple times, namely, whether a cluster tends to re-appear in the same BC or different BCs. Those skilled in the art will appreciate that clusters (especially those frequent ones) may exhibit consistent behaviors over time and that the RU-based behavior classification scheme may capture certain behavior similarity among clusters.

The system 600 also includes a structural modeling component 608. The structural modeling component 608 may be configured to determine dominant states for the clusters. Dominant state analysis provides technique for modeling and characterizing the interaction of features within a cluster. For instance, given a srcIP cluster, all flows in the cluster can be represented as a 4-tuple (ignoring the protocol field) $\{u, x_i, y_i, z_i\}$, where the srcIP has a fixed value u, while the srcPrt (X dimension), dsrPrt (Y dimension) and dstIP (Z dimension) may take any legitimate values. Hence, each flow in the cluster imposes a "constraint" on the three "free" dimensions X, Y and Z. Treating each dimension as a random variable, the flows in the cluster constrain how the random variables X, Y and Z "interact" or "depend" on each other, via the (induced) joint probability distribution P(X, Y, Z). The objective of dominant state analysis is to explore the interaction or dependence among the free dimensions by identifying "simpler"

subsets of values or constraints (called structural models) to represent or approximate the original data in their probability distribution. These subsets may be referred to as dominant states of a cluster. Hence, given the information about the dominant states, the original distribution may be reproduced with reasonable accuracy. For example, suppose a srcIP cluster consisting mostly of scans (with a fixed srcPrt 220) to a large number of random destinations on dstPrt 6129. Then the values in the srcPrt, dstPrt and dstIP dimensions these flows take are of the form (220, 6129, *), where * (wildcard) indicates random or arbitrary values. Clearly this cluster belongs to srcIP BC [0,0,2], and the cluster is dominated by the flows of the form {220, 6129, *}. Hence the dominant state of the cluster is {220, 6129, *}, which approximately represents the nature of the flows in the cluster, even though there might be a small fraction of flows with other states. Those skilled in the art will appreciate that any number of techniques may be utilized to determine the dominant states of a cluster.

Figure 7:
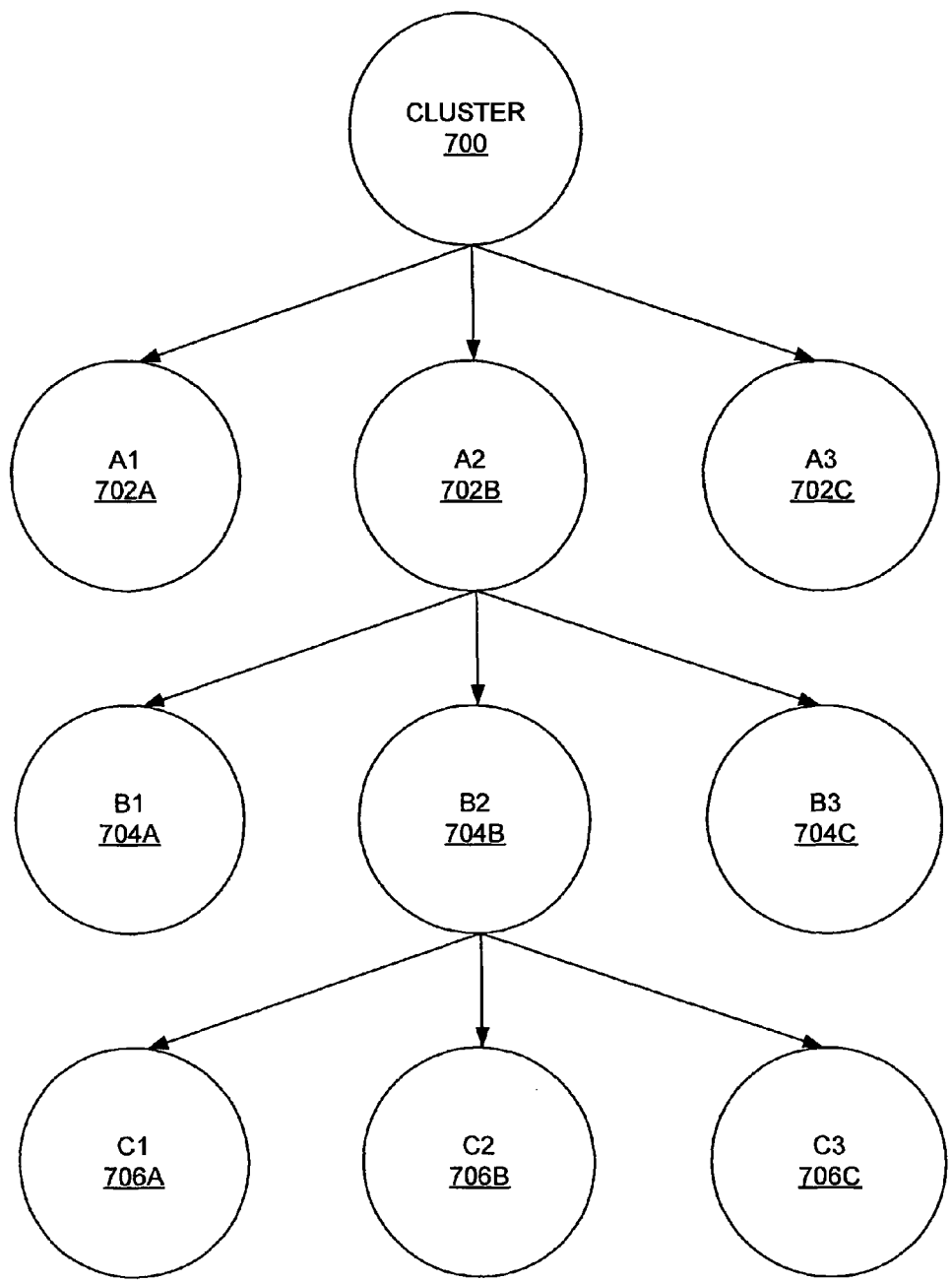
FIG. 7 is a schematic diagram illustrating a process for identifying dominant states of a cluster.

FIG. 7 is a diagram of a cluster 700 illustrating a process for identifying dominant states of the cluster 700. If {A,B,C} is a re-ordering of the three free dimensions X, Y, Z of the cluster based on their RU values, then A is the free dimension with the lowest RU, B the second lowest, and C the highest. To find the dominant states of the cluster 700, the procedure finds the substantial values in the dimension A. A specific value a in the dimension A is substantial if the marginal probability $p(a):=\Sigma_b \Sigma_c p(a, b, c) \geq \delta$, where $\delta$ is a threshold for selecting substantial values. In FIG. 7, a state 702A, for example, represents a state of the cluster 700 where the dimension A has a substantial value A1. Similarly, a state 702B has a substantial value in A of A2, and a state 702C has a substantial value of A3. If no such substantial value exists, there are no dominant states and the process stops.

When substantial values such as A1, A2 and A3 exist, the "dependence" between the dimension A and dimension B may be explored by computing the conditional (marginal) probability of observing a value $b_j$ in the dimension B given $a_i$ in the dimension A: $p(b_j|a_i):=\Sigma_c p(a_i, b_j, c)/p(a_i)$. These substantial $b_j$'s exist when $p(b_j|a_i) \geq \delta$. Stated another way, the process finds substantial values in B given each substantial value a. For example, for the substantial value A2 (i.e. the state 702B), the substantial values B1-B3 may be identified along with their respective states 704A-704C. Further, if no substantial value exists for a given a, the procedure stops.

When states having dominant values for a and b (e.g. the states 704A-C), the process seeks substantial values in C given each $a_i$, $b_j$. The process computes the conditional probability, $p(c_k|a_i, b_j)$, for each $a_i$, $b_j$ to find those substantial $c_k$'s, such that $p(c_k|a_i, b_j) \geq \delta$. The states 706A-706B represents flows having such values of c, i.e., C1, C2 and C3. Upon completion, the dominant state process produces a set of dominant states of the following forms: (*, *, *) (i.e., no dominant states), or $a_i \to (*,*)$, $a_i \to b_j \to *$, or $a_i \to b_j \to c_k$. As will be appreciated by those skilled in the art, the set of dominant states is an approximate summary of the flows in the cluster, and it captures the "most information" of the cluster. Accordingly, the set of dominant states of a cluster provides a compact representation of the cluster.

Figure 8:
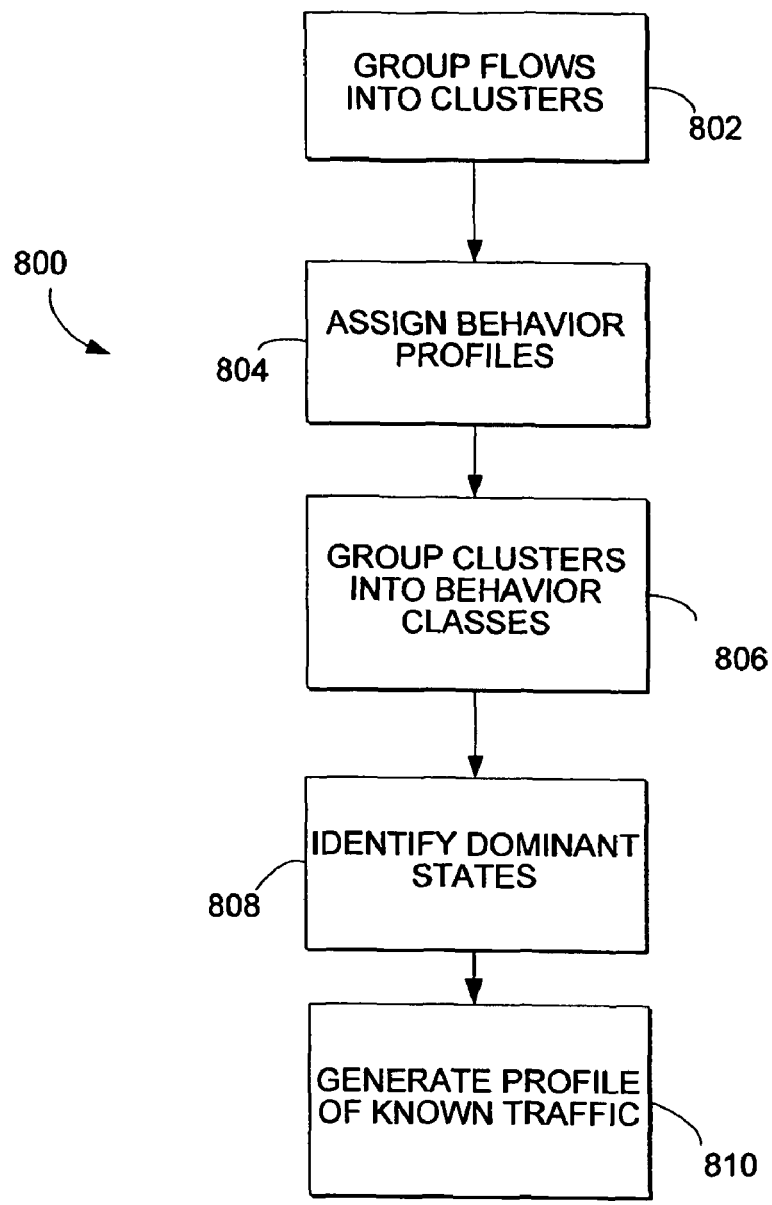
FIG. 8 illustrates a method in accordance with the present invention for interpreting flows of network traffic.

FIG. 8 illustrates a method for interpreting flows of network traffic. At a step 802, the method 800 groups flows into clusters. As previously discussed, each flow sharing a common dimension may be grouped together. For example, flows with the same source port may be grouped together as a cluster.

The method 800, at a step 804, assigns a behavior profile to at least a portion of the clusters. Each cluster may receive a behavior profile, or only clusters exhibited significant behavior may be selected for profiling. The behavior profile may indicate a degree of variability for the flow dimensions, and the behavior profile may take a variety of different forms. For example, an RU value may be computed for each free dimension. This set of RU values will indicate how much variability exists in a cluster for each dimension. Further, the set of RU values may be reduced to a set of labels indicating degrees of uncertainty. For example, each RU value between 0 and 0.33 may be labeled as 0 indicating low uncertainty. Similarly, RU values from 0.34-0.66 may be labeled as 1 indicating medium uncertainty, while RU values from 0.67 to 1 may be labeled as 2 for high uncertainty. Accordingly, the set of RU values may be represented with these labels. Those skilled in the art will recognize that any number of labeling metrics may be appropriate for the present invention.

At a step 806, the method 800 divides the clusters into behavior classes by grouping together clusters with similar behavior profiles. For example, each cluster having the same set of labels may be placed together in a behavior class. More generally, a behavior class may be comprised of each cluster having similar levels of RU for each of the free dimensions. Those skilled in the art will recognize that any number of behavior classes may be appropriate for the present invention and that numerous techniques exist in the art to compare the similarity of behavior profiles and to group clusters having similar profiles.

The method 800, at a step 808, identifies one or more dominant states describing the flows in each of the clusters. As previously explained, the dominant states of a cluster provide a compact representation of the cluster. Further the dominant states of the cluster approximately represent the nature of the flows in the cluster, even though there might be a small fraction of flows with other states. Those skilled in the art will appreciate that any number of techniques, such as the process illustrated by FIG. 7, may be utilized to determine the dominant states of a cluster.

Beyond identifying dominant states, the method 800 may also consider additional features (beyond the four basic dimensions srcIP, dstIP, srcPrt and dstPrt) to identify similarities among clusters within a BC and to distinguish subclasses of behaviors within a BC. Examples of additional features that may be considered are cluster sizes (defined in total flow, packet and byte counts), average packet/byte count per flow within a cluster and variability.

At a step 810, the method 800 generates a profile characterizing well-known traffic patterns on the network. This profile of the network traffic associates behavior classes and dominant states with well-known traffic patterns. For example, a majority of the significant clusters in a network may fall into three "canonical" profiles: typical server/service behavior (mostly providing well-known services); typical "heavy-hitter" host behavior (predominantly associated with well-known services); and typical scan/exploit behavior (frequently manifested by hosts infected with known worms). The canonical behavior profiles may be characterized by key aspects including: (i) BCs and the properties of these classes, (ii) temporal characteristics (frequency and stability) of individual clusters, (iii) dominant states, and (iv) additional attributes such as average flow size in terms of packet and byte counts and their variability.

The profile created at the step 810 may be used to identify anomalous behaviors in the clusters; clusters with behaviors that differ in one or more aspects from the canonical profiles present themselves as more interesting and as warranting closer examination. Indeed, interesting or anomalous behaviors may be found using the profile by either identifying i) novel or unknown behaviors that match the typical server/ service profile, heavy-hitter host profile, or scan/exploit profile, but exhibit unusual feature values, as revealed by analyses of their dominant states or ii) deviant or abnormal behaviors that deviate significantly from the canonical profiles in terms of BCs (e.g., clusters belonging to rare BCs), temporal instability (e.g., unstable clusters that jump between different BCs), or additional features.

One well-known traffic pattern that may be profiled by the method 800 is a server/service behavior profile. For example, a typical server providing a well-known service may show up in either the popular, large and non-volatile srcIP BCs or dstIP BCs. Such BCs may represent the behavior patterns of a server communicating with a few, many or a large number of hosts. Similarly, considering the srcPrt and dstPrt perspectives, the clusters associated with the well-known service ports are expected to generally belong to the same BC's, e.g., either srcPrt BC [2,1,2] or dstPrt BC [2,2,1], representing the aggregate behavior of a (relatively smaller) number of servers communicating with a much larger number of clients on a specific well-know service port. Those skilled in the art will appreciate that, in terms of their temporal characteristics, the individual clusters associated with servers/well-known services will tend to have a relatively high frequency, and almost all will be stable and will re-appear in the same or akin BCs. Further, the average flow size (in both packet and byte counts) of the clusters may show high variability—each cluster typically will consists of flows of different sizes.

Another canonical behavior profile may be referred to as the heavy-hitter host profile. This profile represents hosts (typically clients) that send a large number of flows to a single or a few other hosts (typically servers) in a short period of time (e.g., a 5-minute period). Those skilled in the art will recognize that this profile may include the popular and non-volatile srcIP BC [2,0,0] or BC [2,0,1], and/or the dstIP BC [0,2,0] and BC [0,2,1]. The heavy-hitter host profile may also include clusters that are stable with varied frequencies. These heavy-hitter clusters may also typically be associated with well-known service ports (as revealed by the dominant state analysis), and may contain flows with highly diverse packet and byte counts. For instance, it is expected that many of the heavy-hitter hosts correspond to NAT boxes (many clients behind a NAT box making requests to a few popular web sites, making the NAT box a heavy hitter), web proxies, cache servers or web crawlers.

Another canonical behavior profile may describe behaviors of hosts performing scans or attempting to spread worms or other exploits. Two signs of typical scan/exploit behavior are i) clusters tending to be highly volatile (i.e. appearing and disappearing quickly) and ii) a majority of the flows in the clusters contain one or two packets with fixed size. For example, the profile may indicate that, if most of the flows using TCP protocol in these clusters are failed TCP connections on well-known exploit ports, then such clusters are likely associated with scanning or exploit activities. Those skilled in the art will appreciate that the present profiling techniques are capable of automatically picking out clusters that fit the scan/exploit behavior profile, despite unknown feature values. This capability will enable network operators/security analysts to examine novel, hitherto unknown, or "zero-day" exploits.

Beyond identifying novel or anomalous behaviors that fit the canonical profiles, the method 800 may also identify rare behaviors or deviant behaviors that are worthy of deeper inspection. For example, clusters in the rare behavior classes, by definition, represent atypical behavioral patterns. For example, if three dstPrt clusters suddenly appear in a rare dstPrt BC in several different time slots, and quickly vanish within one or two time slots, then closer examination may be warranted to explain this rare behavior. As another example, clusters that exhibit unstable behaviors such as suddenly jumping between BCs (especially when a frequent cluster jumps from its usual BC to a different BC) often signify anomalies. Such behavior is suspicious and provides an illustration of how fundamental shifts in communication patterns can point a network security analyst to genuinely suspicious activities. As a final example, clusters associated with common service ports that exhibit behaviors that do not fit their canonical profiles may be of concern because these ports are typically not blocked by firewalls.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computer-implemented method for identifying significant clusters from traffic traversing a communications link, said method comprising:
   accessing said communication link with a system including a device configured to read headers of a packet;
   observing a plurality of flows traversing said communication link with said device; grouping together one or more of said plurality of flows into clusters based on said flows having at least one of the same value for the source IP address (srcIP), destination IP address (dstIP), source port (srcPrt), or destination port (dstPrt),
   assigning a probability value to each of said clusters, wherein said probability value relates to a cluster property;
   placing each of said clusters into a set of clusters;
   selecting a probability threshold and an uncertainty threshold;
   removing one or more of said clusters whose assigned probability value is above said probability threshold, wherein each of the one or more removed clusters is identified as a significant cluster;
   computing a relative uncertainty value indicating a level of variability or uniformity among the probability values assigned to the clusters that remain in said set of clusters;
   repeating a series of steps until said relative uncertainty value is equal to or exceeds said uncertainty threshold, wherein said series of steps includes:
      (1) decreasing said probability threshold,
      (2) removing one or more of said clusters remaining in said set of cluster whose assigned probability value is above said probability threshold,
      (3) identifying each of the one or more removed clusters as a significant cluster,
      (4) re-computing a relative uncertainty value indicating a level of variability or uniformity among the probability values assigned to the clusters that remain in said set of clusters, and
      (5) comparing said relative uncertainty value to said uncertainty threshold; and
   assigning said significant clusters to one of a plurality of behavior classes; and
   generating a profile characterizing a plurality of traffic patterns, wherein said profile associates one or more of said plurality of behavior classes with each of said plurality of traffic patterns and said plurality of traffic patterns includes one or more profiles associated with malicious behavior or with exploit behavior.

2. The method of claim 1, wherein said communications link is a backbone of a transit network.

3. The method of claim 1, wherein said cluster property indicates a volume of flows in a cluster.

4. The method of claim 1, wherein each probability value associated with said one or more removed clusters is larger than each probability value associated with the clusters remaining in said set of clusters.

5. The method of claim 1, wherein said uncertainty threshold is equal to or greater than 0.9.

6. A computer-implemented method for identifying a set of significant clusters from traffic on a computer network, the method comprising:
- (a) obtaining a source IP address (srcIP), a destination IP address (dstIP), a source port (srcPrt), or a destination port (dstPrt) associated with each of a plurality of flows traversing a link on said computer network via a device configured to read headers of a packet;
- (b) creating clusters by grouping together one or more of said plurality of flows having the same source IP address (srcIP), destination IP address (dstIP), source port (srcPrt), or destination port (dstPrt), wherein each of said clusters is placed into a set of clusters;
- (c) assigning a probability value to each of said clusters, wherein said probability value relates to the number of flows in a cluster;
- (d) removing from said set of clusters one or more clusters having an assigned probability value above a probability threshold;
- (e) associating each of the one or more removed cluster with a set of significant clusters;
- (f) decreasing said probability threshold;
- (g) determining a relative uncertainty value that indicates a level of relative uncertainty or uniformity among the probability values assigned to the clusters in said set of clusters;
- (h) repeating said steps (d)-(g) until said uncertainty value equals or exceeds an uncertainty threshold, wherein said uncertainty threshold is equal to or greater than 0.75; and dividing said set of significant clusters into a plurality of behavior classes by identifying one or more behavioral characteristics for each of said plurality of significant clusters, wherein said one or more behavioral characteristics includes malicious or exploit behavior.

7. The method of claim 6, wherein said decreasing said probability threshold includes reducing said probability threshold by an exponentially decreasing factor.

* * * * *